G. F. LYNCH.
Rotary Cultivator.

No. 80,643.  Patented Aug. 4, 1868.

Witnesses
T. Smith
D. E. Jones

Inventor.
Geo. F. Lynch
By atty Thos. T. Everett

United States Patent Office.

GEORGE F. LYNCH, OF MILWAUKEE, WISCONSIN.

Letters Patent No. 80,643, dated August 4, 1868.

IMPROVEMENT IN ROTARY CULTIVATOR.

The Schedule referred to in these Letters Patent and making part of the same.

TO ALL WHOM IT MAY CONCERN:

Be it known that I, GEORGE F. LYNCH, of the city of Milwaukee, in the State of Wisconsin, have invented a certain new and useful Improvement in Rotary Cultivators; and I do hereby declare that the following is a full, clear, and exact description of the same, reference being had to the accompanying drawings, and to the letters and marks thereon, which said drawings form part of this specification, and sufficiently represent my invention to enable those skilled in matters relating thereto to construct and use it.

Figure 1:
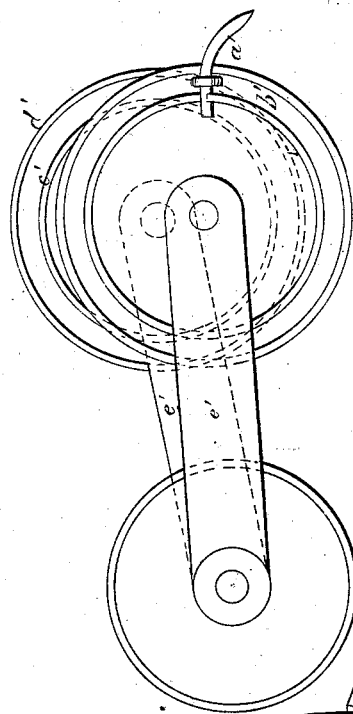
Figure 2:
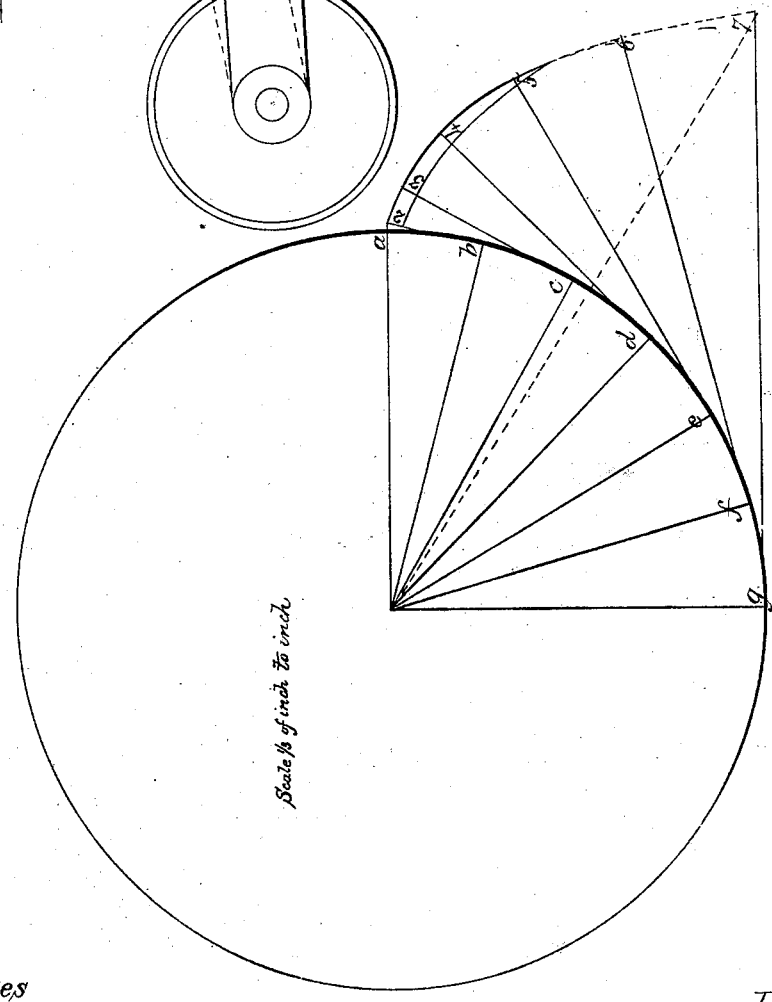

Figure 1, of these drawings, shows the rotating cylinders and guiding-wheels of the cultivator, with the means connecting them, and Figure 2 is explanatory of the method of finding the line of the tooth or spade.

One part of my invention is the result of an effort, if possible, to lay down a rule for a fixed tooth on a cylinder, of such shape that the roll of the cylinder should thrust the tooth into the ground with a clean cut, or so near a clean cut as to leave no practical difference, so that the whole line of the tooth will enter at the point where it first strikes the ground.

The tooth $a'$, on the cylinder or head $b'$, is an exhibit of a tooth formed under my invention, and the method for finding the line of such tooth is indicated by fig. 2, under a scale of one-third of inch to inch.

Cylinder or head, seventy-two inches in circumference; one-quarter round is eighteen inches, which, divided by six, gives three inches as the distance from $a$ to $b$, from $b$ to $c$, from $c$ to $d$, &c.; line $b$ 2 on a tangent at $b$, $c$ 3 on a tangent at $c$, line $d$ 4 on a tangent at $d$, &c. Distance $b$ to 2 equals three inches; distance $c$ to 3 equals six inches; distance $d$ to 4 equals nine inches; distance $e$ to 5 equals twelve inches; distance $f$ to 6 equals fifteen inches; and distance $g$ to 7 equals eighteen inches. $a$ 2 3 4 5 6 and 7, line of the tooth.

It will readily be seen how this rule may be applied to finding the curve of the tooth to suit any size of cylinder or head.

The teeth are placed, at suitable distance apart, on separate heads or cylinders, $b'$, $c'$, $d'$, each having an independent movement on the same axle, or each on a separate axle for the purpose of clearing itself, and where separate heads or cylinders are used, so that any one of them may rise over a stone or any obstruction without throwing the others out. The heads or cylinders are loose on the axle, which will prevent the clogging or choking that must occur when a stiff head is used.

When placed on separate axles, the head or cylinder may be attached to the truck by straps $e'$, as indicated by fig. 1, so as to allow of the rising when going over obstructions, without removing the remaining heads out of the ground, thereby preventing the "skipping" over, and not doing its work.

The heads may be used in the trucks to any number, so as to cultivate any width, from six inches up to ten feet. Any two heads can be drawn together without the use of the trucks, by substituting thills or a pole in the place of the straps that attach it to the forward axle, thus making a very simple machine, that will be useful for cultivating corn or any other production that needs working in between the hills.

What I claim as my invention, and desire to secure by Letters Patent, is—

1. The shape of the tooth and the manner of finding the curve of the same, to suit any-sized head or cylinder, as herein recited.

2. Having the heads loose on the axle, to prevent clogging or choking, as herein described, in combination with the attaching the heads to the truck by straps, so as to permit each head or cylinder to act and move over obstructions independently.

This specification signed, this 28th day of April, 1868.

GEORGE F. LYNCH.

Witnesses:
    A. G. WALDO,
    J. E. PIERCE.